Jan. 28, 1969    D. RUBENSTEIN    3,424,203
IN-PLACE REPAIRS FOR CONCRETE IRRIGATION PIPE
Filed April 26, 1966

INVENTOR.
David Rubenstein

United States Patent Office 3,424,203
Patented Jan. 28, 1969

3,424,203
IN-PLACE REPAIRS FOR CONCRETE IRRIGATION PIPE
David Rubenstein, San Diego, Calif., assignor to Chem Stress Industries, Inc., a corporation of California
Filed Apr. 26, 1966, Ser. No. 545,470
U.S. Cl. 138—98      9 Claims
Int. Cl. F16l 55/61; B32b 35/00

ABSTRACT OF THE DISCLOSURE

This patent application relates to quick methods of repair and apparatus for repairing cracked inverts of existing concrete pipe lines wherein the invert section (the bottom of the pipe) of said concrete pipe lines has been cracked by sonic booms, earth pressures, "slugging of the line as it is called," etc., and generally by dynamically applied loads through the earth from outside of said concrete pipe lines. The invert repairs are made from the inside of the said concrete pipe lines by laminating polymeric resin composition-filler-fiber reinforcements into and onto the concrete body of said pipe and by making very strong composite structure in the area of the repair from the concrete material of the said concrete pipe with said polymeric resin composition-filler-fiber reinforcements and this with no excavation except access holes into said pipe, and this at a fraction of the cost of replacement of such pipe, the only known way prior to this invention.

---

This patent application relates to improvements in methods for the repair of concrete and other porous material pipe lines. The repairs may be made in-place of storage of components for pipe lines or made in-place in the existing installed pipe line. The greatest advantage comes from the repairs made to existing pipe lines since the only other alternative prior to my invention for serious cracks was to remove the pipe line and replace the damaged and cracked sections. Leaks in pipe line systems have been the cause of substantial leaking of transmitted water. The Salt River Valley Water Users Association engineers have reported that as much as 50% of water admitted to their systems has been lost due to transmissions losses.

In the course of my development work in said composite concrete pipe I found the problem of concrete pipe lines in use being cracked in their underground in-place positions. These cracks are thought to originate in the cast-in-place concrete pipe installations from adverse soil pressures and from sonic blast as coming from aircraft when said aircraft go beyond the speed of sound. This is thought to occur particularly when the cast-in-place or other pipe lines are in an empty condition.

The object of this invention is to repair-in-place cracked concrete pipe line systems when invert cracks and ring cracks occur in said concrete pipe lines.

During the research involved in this patent application ring cracks were found to occur at thirty to forty foot intervals in some cases, in some cases as frequent as 10 foot intervals. Invert cracks were found from 10 feet to 1050 feet and continuous approximately in the center of the invert of the pipe. Cracking appeared to be clear through the pipe body width of crack varying from hairline to ¼ inch in width. Occasionally a third type of cracking was found which wandered in multiple directions and was more or less concentrated involving the entire pipe body. Two man teams in the pipe system easily layed from 400 feet lineal to 750 feet lineal of invert repair in one day after a pipe line was dewatered and dried ready for patching.

Another object of the invention is to reinforce a concrete pipe line in-place of use to give strength to overcome bad bearing, cavitation problems, or other requirements where increased strength is required in a pipe line.

These and other objects will be apparent from the drawings and the following description thereof. Reference now is made to the drawings, which are for illustrative purposes showing embodiments of the invention;

Figure 1:
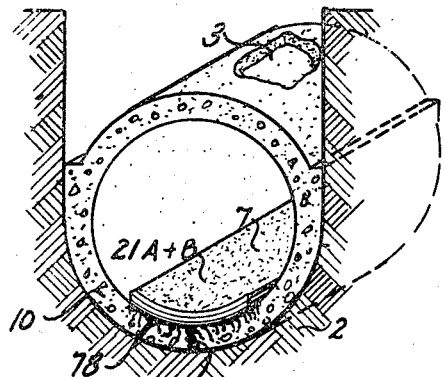
FIGURE 1 shows an illustration of the concrete pipe repair in-place in a section of a pipe line.

Preformed porous structural materials, e.g., concrete of the type specified in cast-in-place concrete pipe lines is usually a 3,000 p.s.i. to 5,000 p.s.i. in compression type of concrete that has a tensile strength of about 300 to 500 p.s.i. Plastic resins, e.g., catalyst-activated, or co-acting polymers as cross-linked polymers of synthetic resins combined with modifying agents and/or inert fillers, extenders and/or pigments, elastomeric materials and rubbers of the type disclosed and claimed herein provide the plastic resin and elastomeric reinforcements, binders and adhesive components. Such plastics may be polymerized as 100% solids (no volatiles) and may be applied in homogenous films as a liquid of 100% solids as layers made in a single application, so-called "one pass" application or can be made in multiple applications either placed at one time or in close sequence.

Fibers of glass fiber, the preferred fiber of the present invention, but not limited thereto, or natural fibers like hemp, cotton, sisal, etc., or synthetic fibers like nylon, polyethylene terephthalate (Dacron), acrylic fibers (Orlon or Dynel etc.,) and/or fuzed quartz, aluminum-silicate (Fibrefrax), ceramic spun fibers, etc., with fibers of both organic and inorganic fibrous materials being used alone or together in any desired combination to provide the reinforcement, and this along with particular polymeric resin composition adhesives and binders.

The concrete pipe system of e.g., an irrigation system is normally in use when a leak is found by water appearing at the surface of the ground. The concrete body of such a pipe line has substantial amounts of water in its porous structure. Some polymeric resin compositions useful in the structural reinforcement of concrete such as some unsaturated polyester resin compositions, and some epoxy resin compositions, and some other polymeric resin compositions known in the art are not always compatible with water while other polymeric resin compositions are compatible with water. These systems would require a completely dry environment for their successful use. However, I have discovered a practical use of certain of these resin compositions by the method herein disclosed.

The means I use with good results is to dewater that portion of a pipe line system that has a length of cracked pipe to be repaired. The length to be repaired is isolated from the rest of the system by closing shut-off valves in the standpipes at either end of the lengths to be repaired or the pipe line is plugged at accessible points from the standpipes involved. Of course the inflow of water is stopped before this plugging up is done and any remaining water in the pipe line is pumped out. The line is then dried out and cleaned out in the invert area so that a concrete surface is exposed about six inches on either side of an invert crack. An air jet is very useful in blowing out excess water which may lay in uneven pockets normally found inside of concrete pipe lines.

As soon as the concrete surface of the inside of the pipe line appears to be dry and the patching procedure is to begin, I have found that best results are obtained when I brush and flow on a high volatile solvent in the area of the crack and over the and in the crack so that I displace any remaining water existing in the crack and in the porous structure of the concrete pipe body adjacent to the crack. The rapid evaporation of the solvent takes with it at least some of the water left in the crack—generally all of the water—because inside of the pipe line it is necessary to use a large blower to force air out of the pipe line for ventilation and safety of the operators in the pipe line. The large blower is located in an access hole cut into the pipe line being repaired. This hole is made big enough to pass a man through it and the apparatus used inside of the pipe line. Secondary holes are cut into the pipe for outlet holes as needed—e.g., about 100 feet apart to 500 feet apart, and this for exit of the blown air. Care must be taken for operator safety and it is best to follow the Rules of Practice layed down by the U.S. Reclamation Service, U.S. Department of the Interior, under whose inspection the instant invention was tested.

A solvent found useful can be made out of a solvent composition that comprises 50% acetone and 50% vinyl toluene but is not limited to said composition. With the surface of the concrete pipe line clean and dry and the crack filled with solvent the next step can be done.

I have found that while other resin compositions work as shown in my prior patents and patent applications if the concrete pipe body is dry or I use a polymeric resin composition as e.g., a polyurethane resin composition that is compatible with water, that a polymeric resin composition made of epoxy resin and polyamine or polyamide resin which can be used in moist conditions as follows provides the overall best composition to use when I consider the personnel involved and the field conditions existing in the pipe line repair job. The preferred composition is made as follows:

60% epoxy resin as e.g., Shell Oil Co. 826, 40%/100% polyamide resin as e.g., General Mills Co. Versamid 140.

To this composition up to 15% vinyl toluene may be added to lower the viscosity and increase workability. At 72° F. glass fiber wets out rapidly with as little as 5% vinyl toluene. The polymeric resin composition may be used without solvent or thinner if the environmental conditions are such that the composition is workable and wets out the glass fiber thoroughly as used. The polymeric resin composition of the example above must be mixed fresh as it is used so that at no time is the curing advanced because full strength bond is obtained with freshly mixed materials. One to two gallon batches are found best since a quantity of glass fiber mats as described herein are wet out and then delivered into the pipe line through the access hole then being used.

Referring now to the FIGURES 1 through 8 for a description of the product and method in view of the apparatus used, FIGURE 1 shows a finished section of a cast-in-place pipe line made of concrete material in-place in the ground at an installation site. The concrete pipe has been dewatered and the surface of the concrete dried substantially free of water. Concrete 10 is shown retained by earth 2. An access hole 3 is shown in the top of the concrete pipe. An invert crack 5 is shown and into this crack and about its adjacent area an amount of solvent and penetrating composition, e.g., acetone and vinyl toluene has been placed and the acetone evaporated from the surface of the cracked area. A first layer of polymeric resin composition 21A and B has been applied to the surface of the concrete for a width of e.g., 12" on the invert area. The resin composition 21A and B has been well brushed down into the crack 5 and a surplus is in place on the concrete.

Figure 2:
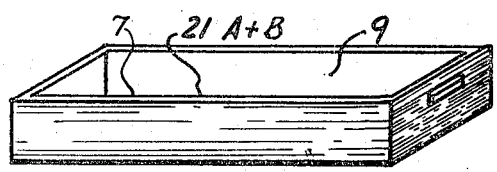
FIGURE 2 shows an impregnating vessel of the invention; and patch.

FIGURE 2 shows a dip tank and impregnating tank which is kept above ground in one method used. Into this tank which is about 12" wide and 3'0" long is placed a quantity of the mixed polymeric resin composition sufficient to cover and thoroughly impregnate e.g., 10 units of laminated glass fibers. In this use the laminated glass fibers 7 comprised three units of uni-directional glass fiber mat as made by Ferro Co., known as Ferro Nuf 1 oz. mat. These mats are cut from roll stock and are uni-directional in the 12" direction. These mats are cut 3'0" long for ease of handling—but can be any other length, e.g., 6" long, etc. Another 12" wide by 3'0" long mat made of Ferro Woven roving having 60 end roving both ways is used inbetween one lower layer of Ferro Nuf uni-directional roving as above and two upper layers of Ferro Nuf uni-directional roving. The four layers of glass fibers in this use constitutes one laminate. For convenience these four layers of glass fibers are immersed in the tank 9 until all fibers are wet out. For ease of handling I tape one end of the set of four layers so that when the fibers are wet I can roll them up. To put the rolls of fibers into the pipe line they are placed in a bucket with the roll standing upright so excess resin can drain off. The binding value of the laminate is dependent upon a sufficiency of resin and care must be taken not to drain off too much resin composition.

Figure 3:
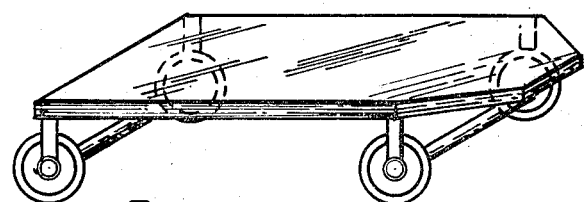
FIGURE 3 shows a pipe line wheeled apparatus upon which an operator lies for traveling through a pipe line to make repairs.

On the start of the operation of placing the laminates into the pipe line the scooter or dollie shown in FIGURE 3 is placed into the pipe line. These scooters are standard equipment inspection apparatus used in inspecting pipe lines.

Figure 4:
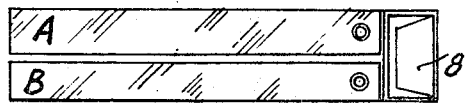
FIGURE 4 shows a pair of tanks and dispensing means for polymeric resin compositions used to bond glass fiber or other fiber in the patching operation.
Figure 5:
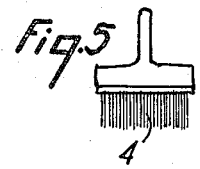
FIGURE 5 shows an applicator means.

As an alternative means of handling the polymeric resins A and B I have devised a two tank means shown in FIGURE 4. This dispensing means for resins A and B comprises two tanks of a size to fit under the scooter of FIGURE 3 to which is attached a mixing-tray 8 so measured amounts of resins A and B are admitted to the mixing tank. Amounts admitted are controlled by valves on said tanks. The applicator 4 of FIGURE 5 is shown as a brush, but any other type of applicator can be used as e.g., a pressure operated spreader-brush connected to the tanks A and B with air pressure supplied by an air cartridge. The surface of the concrete pipe and the crack must be thoroughly covered with polymeric resin composition and the brush has been the preferred means of applying the said composition.

The operator laying on the scooter or sitting on it if the pipe line is larger than 30" diameter first applies a layer of polymeric resin composition onto and into the concrete pipe body. It is important to get projections of polymeric resin composition 78 into the porous body of the pipe and into the crack. The crack must be filled up. When the crack is large, ⅛" to ¼" or more, it is advisable to mix a fine silica powder into the resin composition to make it into a paste filler. This is crammed down into the crack. Also if a wearing surface is desired on top of the laminate, a paste filler is trowelled onto the laminate before curing takes place, in fact as the laminate is layed, and this wearing surface can be made as thick as desired. The laminates are layed much like shingles, the edges overlapping enough to insure continuity of patch.

Figure 6:
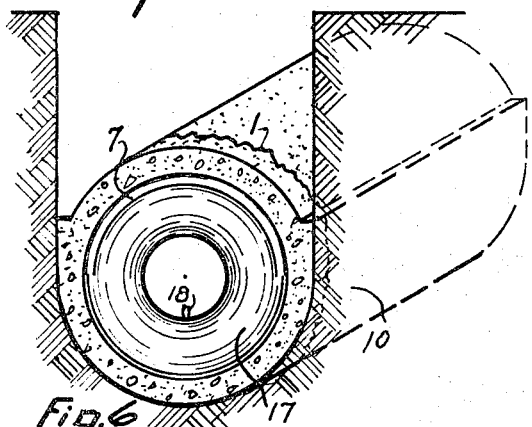
FIGURE 6 shows an inflatable tube and placing means for circular patch.

In FIGURE 6 is shown means for repairing circular cracks comprising an inflatable tube device upon which is placed a prepared patch. The tube must be of a diameter about equal to the pipe line. The tube 17 comprises a large inner tube as used in truck tires or airplane tires. Air valve 18 is used to inflate the tube which is done in place from an air line or air pump.

Figure 7:
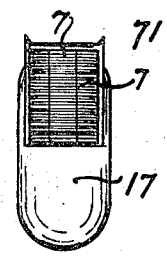
FIGURE 7 shows a side view of FIGURE 6.

FIGURE 7 shows an elevation of the side of the tube apparatus and shows patch 7 mounted on the tube 17. The patch comprises a sheet of heavy corrugated or other cardboard having bent up edges to act as a tray.

On the cardboard is placed the laminate which is impregnated with polymeric resin composition which composition can have thixotropic material like Cab-O-Sil, a finely divided silica, added to it to prevent run-off of the resin from the laminate when it is placed in-place of use. To make a circular patch, the laminate is impregnated with polymeric resin composition 21A and B and is placed upon the cardboard layer. This layer is placed upon the rubber tube 17 and the tube inflated in place of use. The inflated tube presses the patch 7 against the head of the pipe line over the crack which area of patch has just been previously thoroughly brushed with polymeric resin composition which advantageously can have an accelerator added to the setting system of the mix. The tube is left in place until the resin composition sets. Controlled curing can be done in from 5 minutes to an hour, etc.

Figure 8:
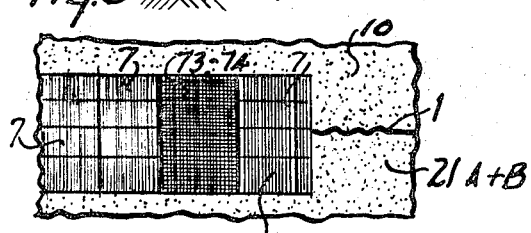
FIGURE 8 shows an enlarged view of a glass fiber patch.

FIGURE 8 shows an enlarged view of a typical patch. Crack 1 is shown in an invert position of a pipe line. Layer 1 of the patch 7 shows uni-directional fibers applied across the patch 7 so that the longitudinal fibers can act as reinforcement across the crack. When a resin composition has substantial shrinkage as in an unsaturated polyester resin composition and/or as in an epoxy resin composition having a shrinkage modifier, e.g., an unsaturated polyester component, the shrinkage of the resin composition induces a prestress preload into the laminate and concrete adjacent thereto as shown in my prior patents.

The second layer of the patch shown comprises woven roving, or multidirectional mat of glass fibers or any other useful fibers, shown as 73 x 74. The weave or mat weight can be any size designed to meet the strength required.

The relation of multi-directional to uni-directional fibers has been found to be best at about three to one of uni-directional to multi-directional. Tests made for the Bureau of Reclamation in 30" and 36" pipe as repaired showed that it required from 11 tons to 15 tons pressure exerted by a hydraulic jack to force a pipe section apart. In all tests the concrete pipe wall cracked in a longitudinal direction at about 180° opposite from the repaired crack and with a secondary crack parallel to the crack but just outside of the patched area. In no test did the repaired crack fail. Repeated blows by a sixteen pound sledge, over 50 blows, failed to crack the repaired pipe. The tests made were considered to be as brutal a test of repaired concrete as could be designed.

The third and fourth layers of uni-directional fibers comprise layers of Ferro Nuf 1 oz. roving mat. According to the requirements of strength the Ferro Nuf can be obtained in heavier mat, e.g., 2 oz. or 3 oz., etc. In any case all fibers must be thoroughly wet out and well brushed into place onto the concrete body of the pipe line. Also sufficient lap must be maintained so that the repair be a continuous member covering the crack and run a few feet past the crack to insure no additional cracking. In the formulation used curing is found to be preferable when it is accomplished in 12 to 24 hours before a pipe line is put back into service which time is considerably less than when a line is replaced. The costs of such repairs is from 1/10 to 1/5 the cost of new pipe and removal of the cracked old pipe.

The terms of description and the expressions used which I have employed are used as terms of teaching description and not of limitation, and I have no intention in the use of such terms and expressions, of excluding any equivalents of the features shown and described or portions thereof, but recognize that various modifications and embodiments within the scope of the invention are possible of the invention claimed.

I claim:

1. The method of repairing invert cracked concrete pipe lines with glass fiber reinforced patching materials embedded in polymerizable polymeric resin composition comprising the steps of:

(1) provide access to a concrete pipe line and cut holes for access into the same following sealing off and dewatering a section of said pipe line to be repaired and subsequently drying the same until ready for repairs;

(2) while making said pipe line section ready for repairs, mix polymerizable polymeric resin composition in batch amount and impregnate in an impregnating tank with a selected polymerizable polymeric resin composition selected from the group consisting of unsaturated polyester resins, epoxy resins with a curing agent therefor, and polyurethane resins the glass fiber laminate patches comprising multi-directional and unidirectional glass fibers in selected amount of number of layers and selected orientation of said glass fibers to provide structural reinforcement;

(3) when said glass fibers patching materials are well impregnated and placed in a handling vessel, pass the same through an access hole in said pipe line, making sure the vessel contains a sufficiency of said polymerizable polymeric resin composition with which to thoroughly cover the concrete body of the pipe line in the area of the crack in said pipe line and with which to cover said glass fibers of said patch;

(4) next apply a sufficiency of a fluid comprising about 50% acetone and 50% vinyl toluene to the surface of the interior of said concrete pipe body in the area of the patch, and in the said crack therein, the fluid substantially penetrating deep into the porous structure of the said concrete pipe body so that the said fluid displaces any water remaining in said porous structure, and said water being removed along with and by reason of the evaporation of the said acetone component of the said fluid and leaving said vinyl toluene in said porous structure for combination with said polymerizable polymeric resin composition when it polymerizes;

(5) next apply a heavy penetrating and covering layer of said selected polymerizable polymeric resin composition into and onto said concrete pipe body in the area of the patch and lay the laminate of a plurality of layers of said glass fibers structural reinforcement by unrolling one of said laminates and carefully spread it out over the crack area layer by layer;

(6) next brush and spread a quantity of said polymerizable polymeric resin composition over the entire area of the patch and over the edges to secure good adhesion of the patch to the concrete body of the said pipe line;

(7) continue process and overlay adjacent patches like shingles and always lay each patch away from the finished patch so that it will not be necessary to work over finished work and allow the patch to cure undisturbed.

2. The method of repairing invert cracked concrete pipe lines as in claim 1, wherein said drying of said inside of said pipe line provides a substantially dry porous structure of said concrete body.

3. The method of repairing invert cracked concrete pipe lines as in claim 2, in which said polymerizable polymeric resin composition comprises an unsaturated polyester resin.

4. The method of repairing invert cracked concrete pipe lines as in claim 1, wherein said polymerizable polymeric resin composition comprises about 40% polyamide resin composition and about 60% epoxy resin composition so that said polyamide resin composition displaces substantially any remaining water in said concrete pipe body porous structure, and said polymerizable polymeric resin composition combines with said vinyl toluene in said porous structure of said concrete pipe body, the said polyamide resin composition, the said epoxy resin composition and the said vinyl toluene of said placement reacting together by polymerization reaction and curing into a thermoset polymeric resin composition in and on said concrete pipe line body.

5. The method of repairing invert cracked concrete pipe lines as in claim 1, in which said polymeric resin composition comprises a polyurethane resin composition.

6. The method of reparing invert cracked concrete pipe lines as in claim 1, in which after drying said pipe line, fill said crack in said pipe line wth a paste filler comprising said selected polymerizable polymeric resin composition having a substantial amount of silica particles therein.

7. The method of repairing invert cracked concrete pipe lines as in claim 1, wherein after said laminate of impregnated glass fibers is placed on said crack in said concrete body of said pipe line, place a layer of substantial thickness comprising a wearing layer comprising said polymerizable polymeric resin composition having a substantial amount of silica particles as a filler therein.

8. The method of repairing invert cracked concrete pipe lines as in claim 1, wherein said polymerizable polymeric resin composition has a substantial shrinkage and said shrinkage upon polymerization of said polymeric resin compositon is captured into said laminate and into said concrete body of said pipe line whereby said shrinkage as a captured force system induces a prestress preload into said laminate and the concrete adjacent thereto of said concrete body of said concrete pipe line.

9. The method of repairing circular cracked concrete pipe lines as in claim 1 wherein the area of the crack and adjacent thereto is covered with said polymeric resin composition and the patching materials are mounted upon a cardboard sheet which is secured to an inflatable tube and said tube and patching materials are pressed into place of final use over and into said circular crack by means of injecting air into said tube at place of use and thoroughly pressing said patching materials into and over said crack and curing said polymeric resin composition and fiber reinforcements and thereby bonding said materials to said concrete body of said pipe line, and then removing said tube and said cardboard leaving a finished bonded patch to said concrete pipe line.

References Cited

UNITED STATES PATENTS

| | | | |
|---|---|---|---|
| 2,718,829 | 9/1955 | Seymour et al. | |
| 2,795,523 | 6/1957 | Cobb et al. | 156—94 |
| 2,924,546 | 2/1960 | Shaw | 156—94 |
| 3,149,646 | 9/1964 | Xenis | 138—97 |
| 3,269,421 | 8/1966 | Telford et al. | 138—97 |
| 1,970,328 | 8/1934 | MacIldowie | 161—205 XR |

OTHER REFERENCES

"Reconditioning Inf.," Chevrolet Motor Division of G. M., copyright 1955, pp. 1–10.

"Modern Plastics" Patch It With Plastics, December 1955, pp. 98–100–222.

Textile Fibers Info., Bulletin N–128, DuPont Co., April 1960.

LAVERNE D. GEIGER, Primary Examiner.

B. KILE, Assistant Examiner.

U.S. Cl. X. R.

156—94